UNITED STATES PATENT OFFICE.

WILLIAM TRINDER, OF PHILADELPHIA, PENNSYLVANIA.

IMPROVEMENT IN MEDICAL COMPOUNDS FOR LUNG AND OTHER DISEASES.

Specification forming part of Letters Patent No. 132,119, dated October 8, 1872.

*To all whom it may concern:*

Be it known that I, WILLIAM TRINDER, of Philadelphia, in the county of Philadelphia and State of Pennsylvania, have invented a new and valuable improvement in composition of matter to be known as lacto-phosphate of lime and cod-liver oil; and I do hereby declare that the following is a full, clear, and exact description of the construction and operation of the same, reference being had to the annexed drawing making a part of this specification and to the letters and figures of reference marked thereon.

My improved composition is intended as a medicine, to be used principally for diseases of the lungs, though it may be taken with advantage for other complaints, and will be found very beneficial in building up constitutions which have been impaired by sickness or other cause.

The ingredients employed and their proportions are as follows: Lactic acid, eight ounces; phosphate of lime, eight ounces; sugar, sixteen ounces; gum-arabic, sixteen ounces; glycerine, twelve ounces; cod-liver oil, two quarts; lime-water, one pint; oil myrrhbane, one-half ounce.

These are compounded as follows: Dissolve the phosphate of lime in the lactic acid; then take the sugar and gum-arabic, mix these two thoroughly in a mortar, and add the already-prepared lacto-phosphate of lime, and then gradually the cod-liver oil; when well mixed add the lime-water, and, lastly, the glycerine and oil myrrhbane.

What I claim as my invention, and desire to secure by Letters Patent, is—

The above-described compound, composed of the ingredients substantially as set forth.

In testimony that I claim the above I have hereunto subscribed my name in the presence of two witnesses.

WILLIAM TRINDER.

Witnesses:
   CHAS. MARKFIELD,
   M. DANL. CONNOLLY.